(12) United States Patent
Kleckner et al.

(10) Patent No.: US 10,082,592 B2
(45) Date of Patent: Sep. 25, 2018

(54) RESISTIVITY IMAGER WITH REDUCED BOREHOLE LOADING

(71) Applicant: Sondex Wireline Limited, Yately (GB)

(72) Inventors: Dean Douglas Kleckner, Farnborough (GB); Marian Morys, Downingtown, PA (US)

(73) Assignee: Sondex Wireline Limited, Farnborogh, Hampshire (GB)

( * ) Notice: Subject to any disclaimer, the term of this patent is extended or adjusted under 35 U.S.C. 154(b) by 321 days.

(21) Appl. No.: 14/842,634

(22) Filed: Sep. 1, 2015

(65) Prior Publication Data

US 2017/0059736 A1 Mar. 2, 2017

(51) Int. Cl.
  *G01V 3/24* (2006.01)
  *G01V 3/20* (2006.01)
(52) U.S. Cl.
  CPC ........................................ *G01V 3/20* (2013.01)
(58) Field of Classification Search
  CPC ........................................................ G01V 3/20
  USPC ........................................................ 324/355
  See application file for complete search history.

(56) References Cited

U.S. PATENT DOCUMENTS

| 701,498 A * | 6/1902 | Schlumberger .......... G01B 5/26 33/124 |
| 2,388,896 A | 11/1945 | Alken |
| 4,714,889 A | 12/1987 | Chapman et al. |
| 2013/0068526 A1* | 3/2013 | Snyder .............. E21B 47/02216 175/40 |

FOREIGN PATENT DOCUMENTS

| GB | 701498 A | 12/1953 |
| GB | 721115 A | 12/1954 |
| GB | 2129946 A | 5/1984 |
| GB | 2311139 A | 9/1997 |
| WO | 2011146889 A1 | 11/2011 |

OTHER PUBLICATIONS

European Search Report and Opinion issued in connection with corresponding EP Application No. 16185382.5 dated Jan. 30, 2017.

* cited by examiner

*Primary Examiner* — Melissa Koval
*Assistant Examiner* — Courtney McDonnough
(74) *Attorney, Agent, or Firm* — Crowe & Dunlevy, P.C.

(57) ABSTRACT

A borehole resistivity instrument for use in a borehole drilled within a geologic formation includes an emitting electrode and an imaging electrode. The borehole resistivity instrument also includes a current isolator positioned between the emitting electrode and the imaging electrode. The current isolator prevents a substantial portion of the electric current emitted from the emitting electrode from passing to the imaging electrode through the borehole.

17 Claims, 3 Drawing Sheets

RESISTIVITY IMAGER WITH REDUCED BOREHOLE LOADING

FIELD OF THE INVENTION

This application relates generally to instruments and sensors useable in a downhole environment, and more particularly, but not by way of limitation, to a mechanism for improving the efficiency and resolution of resistivity borehole imaging.

BACKGROUND

Electrical resistivity has been used to evaluate characteristics of geological formations in drilling operations. As noted in the PRIOR ART depiction of FIG. 1, a downhole tool 200 is outfitted with one or more transmitter electrodes 202 and one or more imaging electrodes 204. The imaging electrodes 204 are often positioned in close proximity to the mud cake 206 of the uncased borehole 208. The transmitter electrode 202 then discharges an electrical current, a portion of which passes through the borehole fluid, mud cake 206, and geologic formation 210 and is received by the imaging electrode 204. The changes between the current received by the imaging electrode 204 and the current emitted by the transmitter electrode 202 can be interpreted to provide useful information about the porosity, density and other features of the geologic formation 210.

The use of borehole resistivity to directly evaluate the characteristics of the formation suffers from a significant drawback. Namely, a significant portion of current applied by the transmitting electrode 202 passes directly through the borehole 208 to the imaging electrode 204 (shown in dashed lines). Because the fluid in the borehole 208 may be significantly more conductive than the formation 210, the current tends to dissipate quickly through the borehole 208 and does not pass through the formation 210. The dissipation of current through the borehole 208 necessitates the use of higher powered transmitting currents, which is inefficient and yields a poor signal-to-noise ratio. Accordingly, it would be desirable to provide systems and methods that overcome the afore-described problems and drawbacks.

SUMMARY OF THE INVENTION

In some embodiments, the present invention includes a borehole resistivity instrument for use in a borehole drilled within a geologic formation, wherein the borehole resistivity instrument includes an emitting electrode and an imaging electrode. The borehole resistivity instrument also includes a current isolator positioned between the emitting electrode and the imaging electrode.

In another aspect, some embodiments include a borehole resistivity instrument for use in a borehole drilled within a geologic formation, where the borehole resistivity instrument includes a first current isolator, a second current isolator, an emitting electrode positioned between the first current isolator and the second current isolator and an imaging electrode spaced apart from the first current isolator, second current isolator and emitting electrode.

In yet another aspect, some embodiments include a borehole resistivity instrument for use in a borehole drilled within a geologic formation, wherein the borehole has a diameter. The borehole resistivity instrument includes an emitting electrode configured to emit an electric current into the borehole and geologic formation and an imaging electrode configured to receive the electric current emitted by the emitting electrode. The borehole resistivity instrument further includes a current isolator positioned between the emitting electrode and the imaging electrode, wherein the current isolator prevents a substantial portion of the electric current emitted from the emitting electrode from passing to the imaging electrode through the borehole.

DETAILED DESCRIPTION

Figure 1:
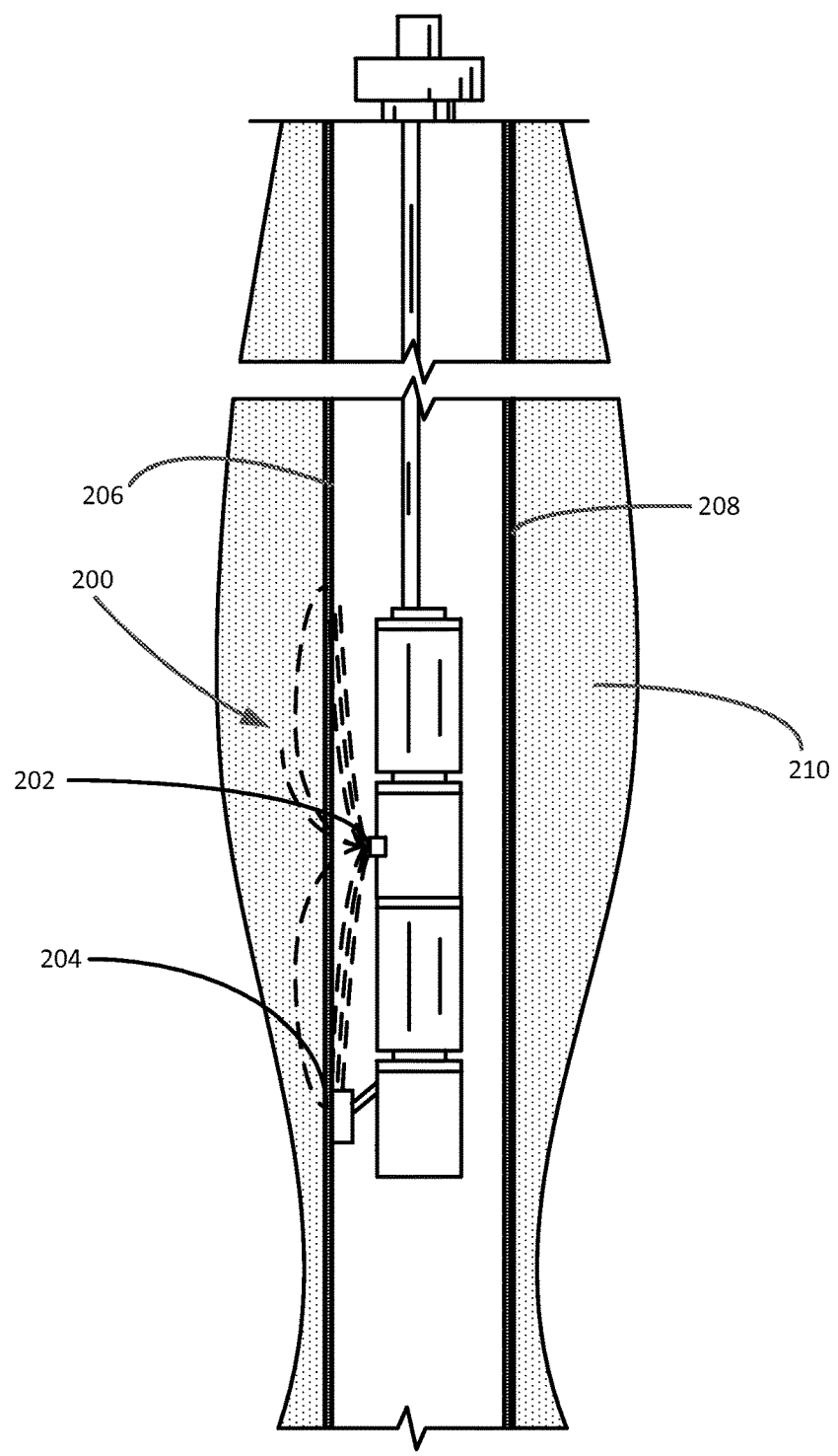
FIG. 1 is an elevational view of a PRIOR ART borehole resistivity instrument.
Figure 2:
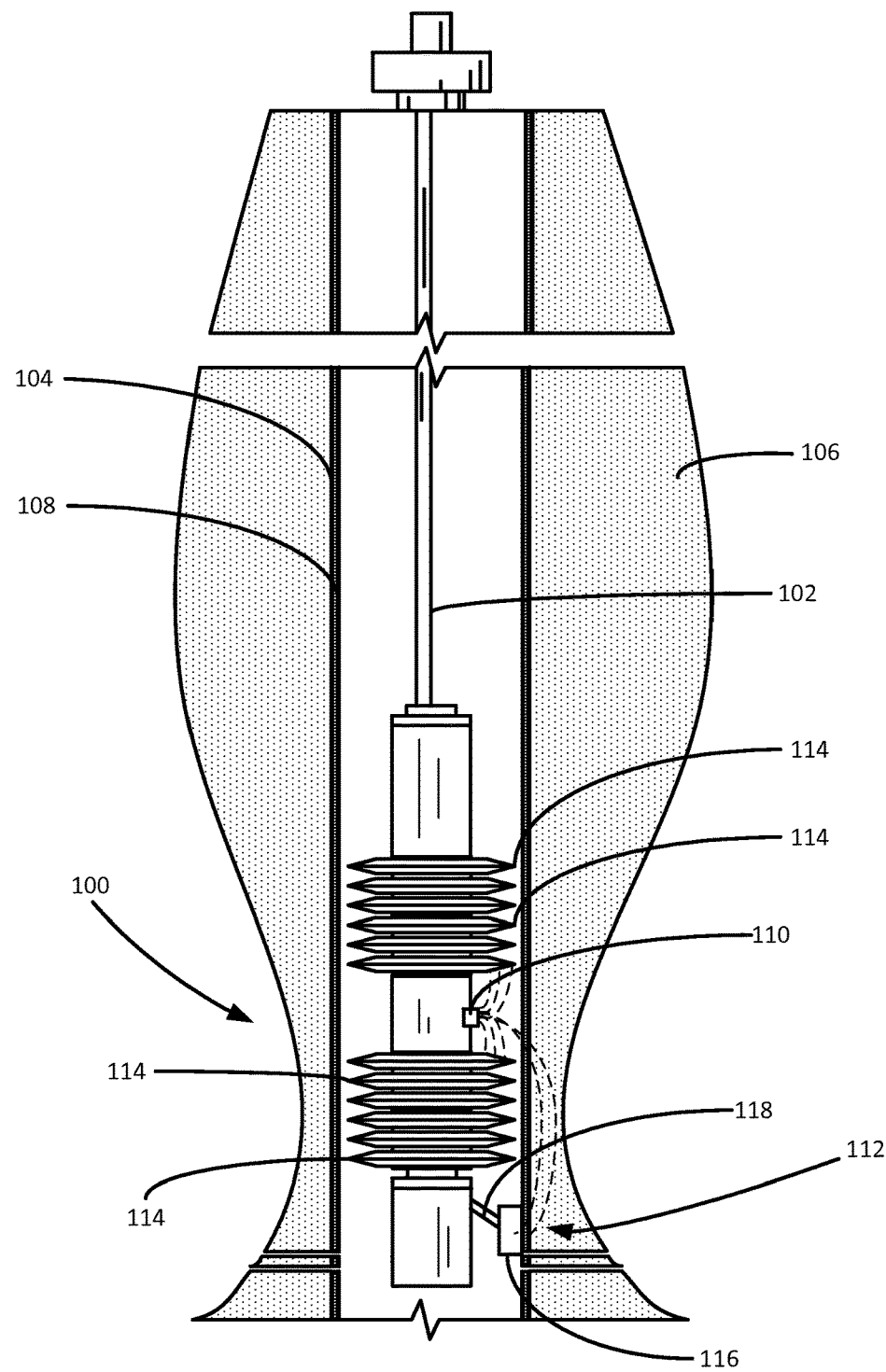
FIG. 2 is an elevational view of a borehole resistivity instrument constructed in accordance with some embodiments.

In accordance with an embodiment of the present invention, FIG. 2 shows an elevational view of a borehole resistivity instrument 100 attached to a deployment cable 102. The borehole resistivity instrument 100 and deployment cable 102 are disposed in an uncased borehole 104, which has been drilled within a formation 106 that is expected to contain a production fluid such as water or petroleum. The borehole 104 includes a mud cake 108 that results from the adherence of drilling fluids on the walls of the uncased borehole 104. As used herein, the term "petroleum" refers broadly to all mineral hydrocarbons, such as crude oil, gas and combinations of oil and gas. In some embodiments, the deployment cable 102 is a "wireline" cable that controllably deploys and recovers the borehole resistivity instrument 100 within the borehole 104 and passes signals to and from the borehole resistivity instrument 100. In alternative embodiments, the borehole resistivity instrument 100 may pass information to the surface through drill pipe or other conveyance means.

The borehole resistivity instrument 100 includes one or more emitting electrodes 110, one or more imaging electrodes 112 and one or more current isolators 114. When energized with electrical power from the surface through the deployment cable 102, the emitting electrodes 110 are configured to produce an electrical current within the borehole 104. The imaging electrodes 112 are configured to receive the electric current produced by the emitting electrodes 110 and produce a signal representative of the measured current. In an embodiment, the imaging electrodes 112 are arranged in a sensing pad array 116 that is positioned against the mud cake 108 or wall of the borehole 104 via a control arm 118. The sensing pad array 116 is configured and positioned to optimize the measurement of electric current returning to the borehole resistivity instrument 100 from the formation 106. The sensing pad array 116 provides a high resolution response as the borehole resistivity instrument 100 is moved through the borehole 104. The borehole resistivity instrument 100 may be part of a larger system of diagnostic tools that may be referred to as "formation evaluation" or "open-hole" logging strings. The borehole resistivity instrument 100 may also be deployed in combination with other downhole tools, including pumps, motors and drilling equipment.

The current isolators 114 are positioned around the body of the borehole resistivity instrument 100 between the emitting electrodes 110 and the imaging electrodes 112. In some embodiments, the borehole resistivity instrument 100 includes current isolators 114 on both sides of the emitting electrodes 110. The current isolators 114 may be manufactured from a flexible polymer or polymer blend that exhibits good resistance to elevated temperatures, borehole fluids and desirable dielectric properties. Suitable materials of construction include elastomers containing fluoropolymers and silicon polymers.

Figure 3:
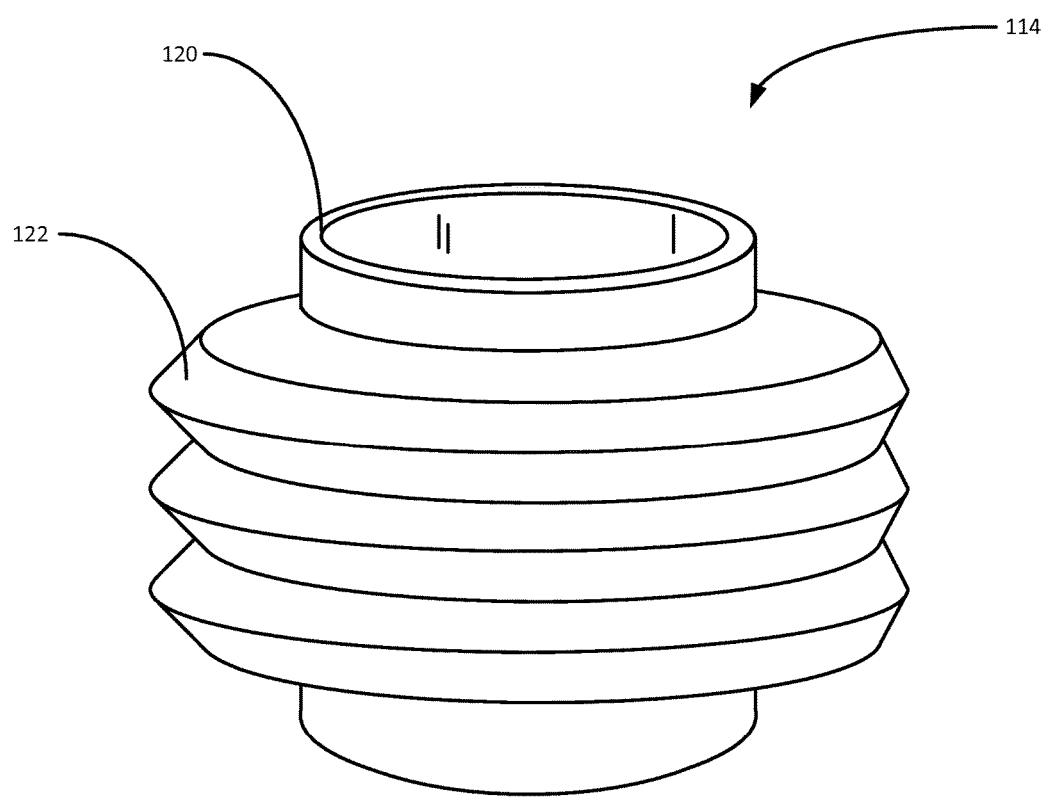
FIG. 3 is a perspective view of an isolation sleeve of the borehole resistivity instrument of FIG. 2.

As shown in FIG. 3, each current isolator 114 includes a central portion 120 and one or more protrusions 122. The central portion 120 is sized and configured to be placed over the exterior of the borehole resistivity instrument 100 adjacent the emitting electrodes 110. The protrusions 122 may be configured as fins that extend radially outward from the central portion 120 and exhibit increased flexibility and capacity for deflection. In some embodiments, the protrusions 122 have an outer diameter that is the same or only nominally less than the inner diameter of the borehole 104. In this way, the protrusions 122 almost entirely block the movement of borehole fluid across the current isolator 114.

As illustrated in FIG. 2, the fluid block created by the current isolators 114 significantly reduces the transmission of electric current through the borehole 106. By reducing the stray current emitted from the emitting electrodes 110, a more significant portion of emitted current passes through the formation 106 before returning to the imaging electrodes 112. The more efficient emission of current from the borehole resistivity instrument 100 permits the use of lower power emitting electrodes 110 and makes possible the creation of resistivity images with a significantly improved signal-to-noise ratio.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the spirit of the present invention.

What is claimed is:

1. A borehole resistivity instrument for use in a borehole drilled within a geologic formation, wherein the borehole has a borehole diameter and wherein the borehole may be filled with borehole fluid, the borehole resistivity instrument comprising:
   an emitting electrode;
   an imaging electrode; and
   a current isolator positioned between the emitting electrode and the imaging electrode, wherein the current isolator has an outer diameter than is substantially the same as the borehole diameter and wherein the current isolator blocks borehole fluid from moving between the emitting electrode and the imaging electrode.

2. The borehole resistivity instrument of claim 1, wherein the current isolator comprises:
   a central portion; and
   one or more protrusions extending radially outward from the central portion.

3. The borehole resistivity instrument of claim 1, wherein the current isolator is manufactured from an elastomer.

4. The borehole resistivity instrument of claim 3, wherein the current isolator is manufactured from a material selected from the group consisting of fluoropolymers and silicon polymers.

5. The borehole resistivity instrument of claim 1, wherein the borehole resistivity instrument comprises a second current isolator positioned about the borehole resistivity instrument such that the emitting electrode is between the current isolator and the second current isolator.

6. The borehole resistivity instrument of claim 1, wherein the imaging electrode comprises:
   a sensing pad array; and
   a control arm.

7. A borehole resistivity instrument for use in a borehole drilled within a geologic formation, wherein the borehole has a borehole diameter and may be filled with a borehole fluid, the borehole resistivity instrument comprising:
   a first current isolator;
   a second current isolator;
   an emitting electrode positioned between the first current isolator and the second current isolator;
   an imaging electrode spaced apart from the first current isolator, second current isolator and emitting electrode; and
   wherein each of the first current isolator and second current isolator has an outer diameter than is substantially the same as the borehole diameter and wherein each of the first current isolator and second current isolator blocks borehole fluid from moving between the emitting electrode and the imaging electrode.

8. The borehole resistivity instrument of claim 7, wherein the first current isolator comprises: a central portion; and one or more protrusions extending radially outward from the central portion.

9. The borehole resistivity instrument of claim 7, wherein the second current isolator comprises:
   a central portion; and
   one or more protrusions extending radially outward from the central portion.

10. The borehole resistivity instrument of claim 7, wherein the first current isolator is manufactured from an elastomer.

11. The borehole resistivity instrument of claim 10, wherein the first current isolator is manufactured from a material selected from the group consisting of fluoropolymers and silicon polymers.

12. The borehole resistivity instrument of claim 7, wherein the imaging electrode comprises:
   a sensing pad array; and
   a control arm.

13. A borehole resistivity instrument for use in a borehole drilled within a geologic formation, wherein the borehole has a borehole diameter, the borehole resistivity instrument comprising:
   an emitting electrode configured to emit an electric current into the borehole and geologic formation;
   an imaging electrode configured to receive the electric current emitted by the emitting electrode; and
   a current isolator positioned between the emitting electrode and the imaging electrode, wherein the current isolator has an outer diameter that is only nominally smaller than the borehole diameter and wherein the current isolator places the emitting electrode in fluid isolation from the imaging electrode and prevents a substantial portion of the electric current emitted from the emitting electrode from passing to the imaging electrode through the borehole.

14. The borehole resistivity instrument of claim 13, wherein the current isolator comprises:
   a central portion; and one or more protrusions extending radially outward from the central portion.

15. The borehole resistivity instrument of claim 13, wherein the current isolator is manufactured from an elastomer.

16. The borehole resistivity instrument of claim 13, wherein the current isolator is manufactured from a material selected from the group consisting of fluoropolymers and silicon polymers.

17. The borehole resistivity instrument of claim 13, wherein the imaging electrode comprises:
 a sensing pad array; and
 a control arm.

\* \* \* \* \*